United States Patent
Yasuda (10) Patent No.: US 9,703,114 B2
(45) Date of Patent: Jul. 11, 2017

(54) IMAGE STABILIZER, LENS BARREL, IMAGE PICKUP APPARATUS, AND OPTICAL APPARATUS

(71) Applicant: CANON KABUSHIKI KAISHA, Tokyo (JP)

(72) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 14/622,341

(22) Filed: Feb. 13, 2015

(65) Prior Publication Data
US 2015/0237259 A1  Aug. 20, 2015

(30) Foreign Application Priority Data

Feb. 17, 2014 (JP) ................................. 2014-027209

(51) Int. Cl.
*H04N 5/228* (2006.01)
*G02B 27/64* (2006.01)
*G02B 7/02* (2006.01)

(52) U.S. Cl.
CPC .......... *G02B 27/646* (2013.01); *G02B 7/026* (2013.01); *G02B 7/021* (2013.01)

(58) Field of Classification Search
CPC ...... G02B 27/646; G02B 7/026; G02B 7/021; H04N 5/23248; H04N 5/23287; H04N 5/2253; G03B 2217/0055

USPC .............. 348/207.99, 208.6, 208.11, 208.14, 348/208.13, 208.2, 208.3, 208.1, 208.5; 310/12.05; 396/52–55

See application file for complete search history.

(56) References Cited

U.S. PATENT DOCUMENTS

| 2010/0202766 A1* | 8/2010 | Takizawa ................. G03B 5/00 396/55 |
| 2011/0141566 A1* | 6/2011 | Suzuka ................ G02B 27/646 359/557 |
| 2014/0119717 A1* | 5/2014 | Yasuda ................ G02B 27/646 396/55 |

FOREIGN PATENT DOCUMENTS

| JP | 2008-134329 A | 6/2008 |
| JP | 2008-134329 | * 12/2008 |

\* cited by examiner

*Primary Examiner* — Lin Ye
*Assistant Examiner* — Euel Cowan
(74) *Attorney, Agent, or Firm* — Cowan, Liebowitz & Latman, P.C.

(57) ABSTRACT

An image stabilizer includes a support member, a movable member holding a correcting member and rotatable relative to the support member around a first rotating axis, which intersects with an optical axis, or a second rotating axis, which intersects with both the optical axis and the first rotating axis, and a restricting member which rotatably holds the movable member around the first rotating axis and restricts rotation of the movable member around the second rotating axis. The support member rotatably holds the restricting member around the second rotating axis along with the movable member and restricts rotation of the restricting member relative to the support member around the first rotating axis.

11 Claims, 11 Drawing Sheets

IMAGE STABILIZER, LENS BARREL, IMAGE PICKUP APPARATUS, AND OPTICAL APPARATUS

BACKGROUND OF THE INVENTION

Field of the Invention

The invention relates to an image stabilizer mounted on various apparatuses, such as an image pickup apparatus.

Description of the Related Art

An image stabilizer moves a movable unit holding an optical member or an image pickup element in two directions (yaw direction and pitch direction) in a plane perpendicular to an optical axis so as to reduce influence by hand shake when shooting.

An image stabilizer disclosed in Japanese Patent Laid-Open No. ("JP") 2008-134329 moves a movable unit holding a correcting lens in two directions on a surface of a sphere having a predetermined point as a spherical center so as to prevent degradation of optical performance when moving the correcting lens.

However, in the image stabilizer of JP2008-134329, a holding frame holding a first lens is movably supported relative to a supporting frame through three spheres. Since the holding frame comes into contact with the supporting frame at three points, a degree of freedom of the holding frame is three. The holding frame thus rotates in an optical axis rotational direction (roll direction) in addition to a yaw and pitch directions relative to the supporting frame. The holding frame is moved by two actuators generating driving forces in a yaw and pitch directions. When the holding frame rotates around an optical axis by influence of disturbance, a position of the first lens is precisely controlled. As a result, accurate image stabilization is not performable.

SUMMARY OF THE INVENTION

In view of the foregoing, the invention provides an image stabilizer capable of suppressing rotation around an optical axis.

An image stabilizer as one aspect of the present invention includes a support member, a movable member holding a correcting member and rotatable relative to the support member around a first rotating axis, which intersects with an optical axis, or a second rotating axis, which intersects with both the optical axis and the first rotating axis, and a restricting member which rotatably holds the movable member around the first rotating axis and restricts rotation of the movable member around the second rotating axis. The support member rotatably holds the restricting member around the second rotating axis along with the movable member and restricts rotation of the restricting member relative to the support member around the first rotating axis.

Further features of the present invention will become apparent from the following description of exemplary embodiments with reference to the attached drawings.

DESCRIPTION OF THE PREFERRED EMBODIMENTS

Exemplary embodiments of the invention will be described below with reference to the accompanied drawings. In each of the drawings, the same elements will be denoted by the same reference numerals and the duplicate descriptions thereof will be omitted. In each Embodiment, the invention, which is applied to an image stabilizer mounted on an image pickup apparatus and an optical apparatus, is explained. For example, the invention is capable of being applied to the image pickup apparatus, such as a digital video camera, a surveillance camera, and a Web camera, and an electronic apparatus equipping the image pickup apparatus, such as a mobile phone and a tablet terminal. The invention is also capable of being applied to an optical apparatus as like an observation apparatus, such as an interchangeable lens attached to a digital single lens reflex camera, a binoculars, and a field scope.

Embodiment 1

An image stabilizer 100 according to this embodiment is explained referring to FIGS. 1 to 6.

Figure 1:
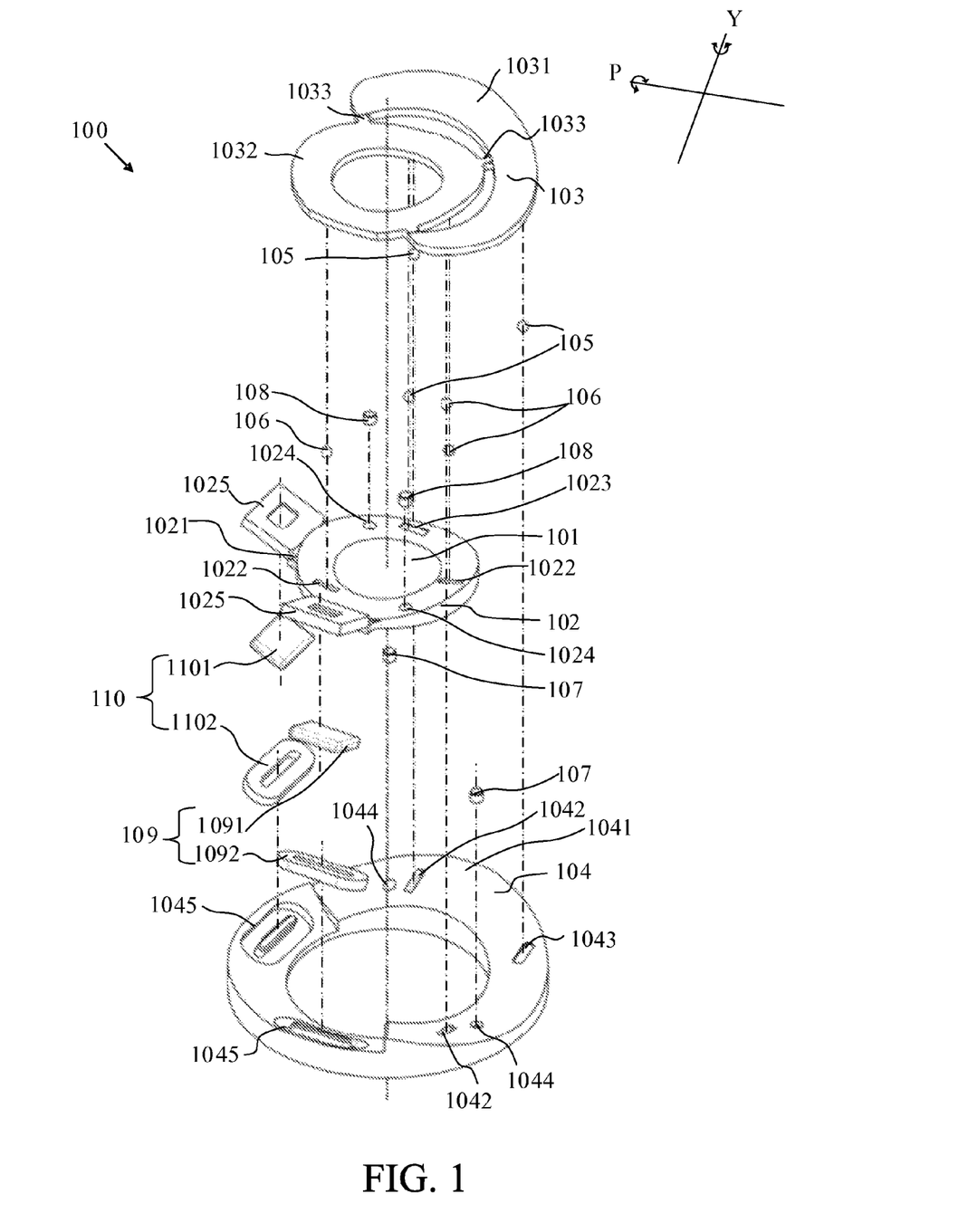
FIG. 1 is an exploded perspective view of an image stabilizer according to Embodiment 1.
Figure 2:
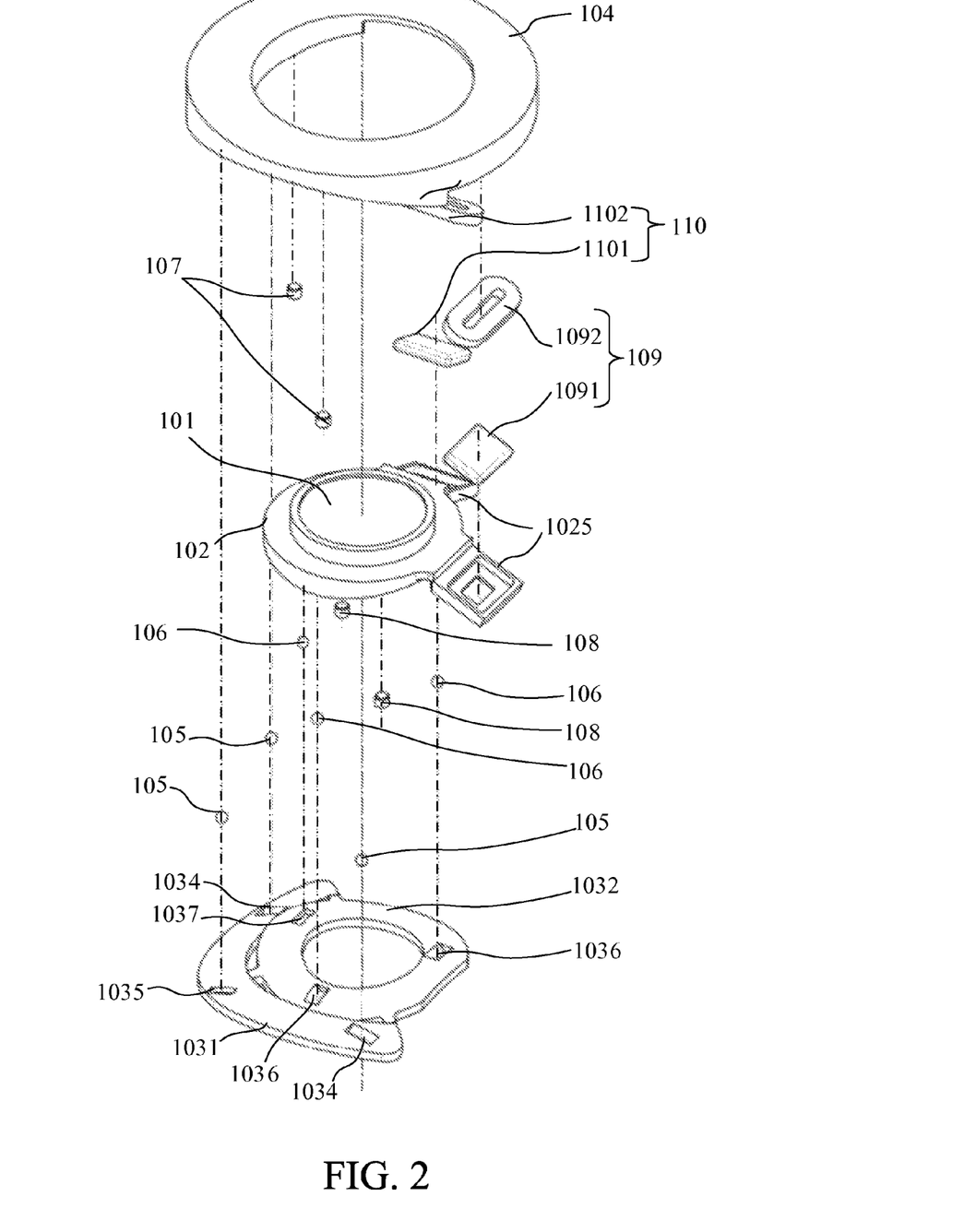
FIG. 2 is an exploded perspective view of the image stabilizer according to Embodiment 1 when viewed from other direction.
Figure 3A:
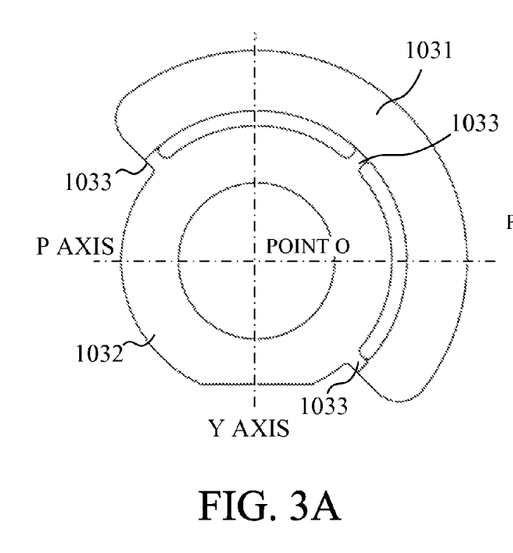
FIGS. 3A-3D are schematic diagrams illustrating a rotation preventing plate.
Figure 3B:
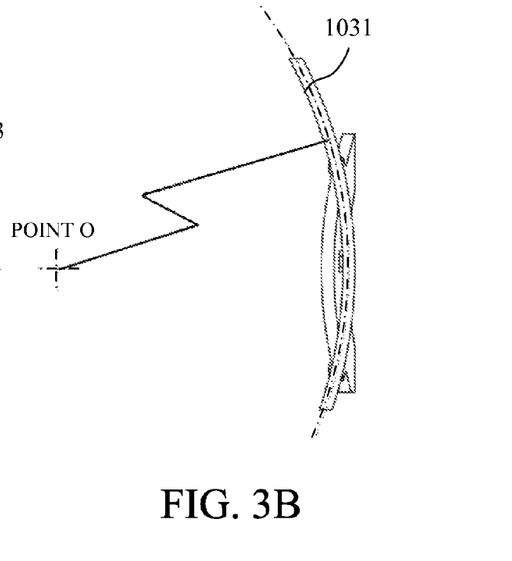
Figure 3C:
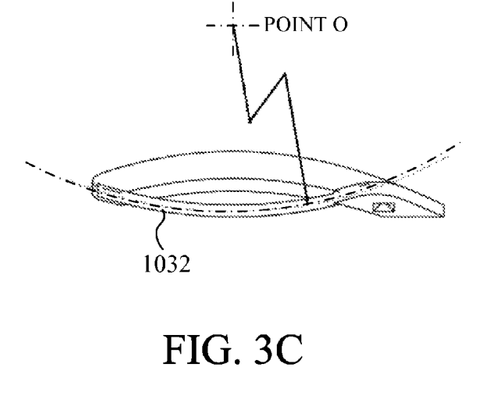
Figure 3D:
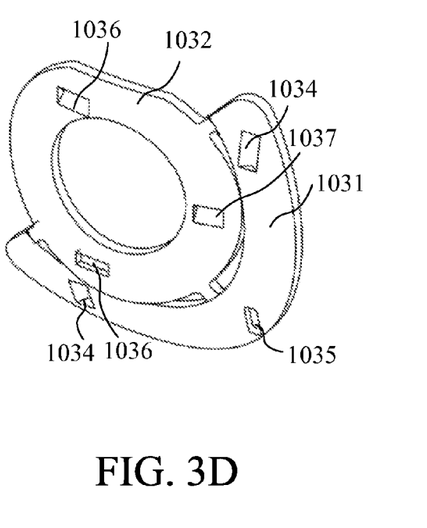
Figure 4:
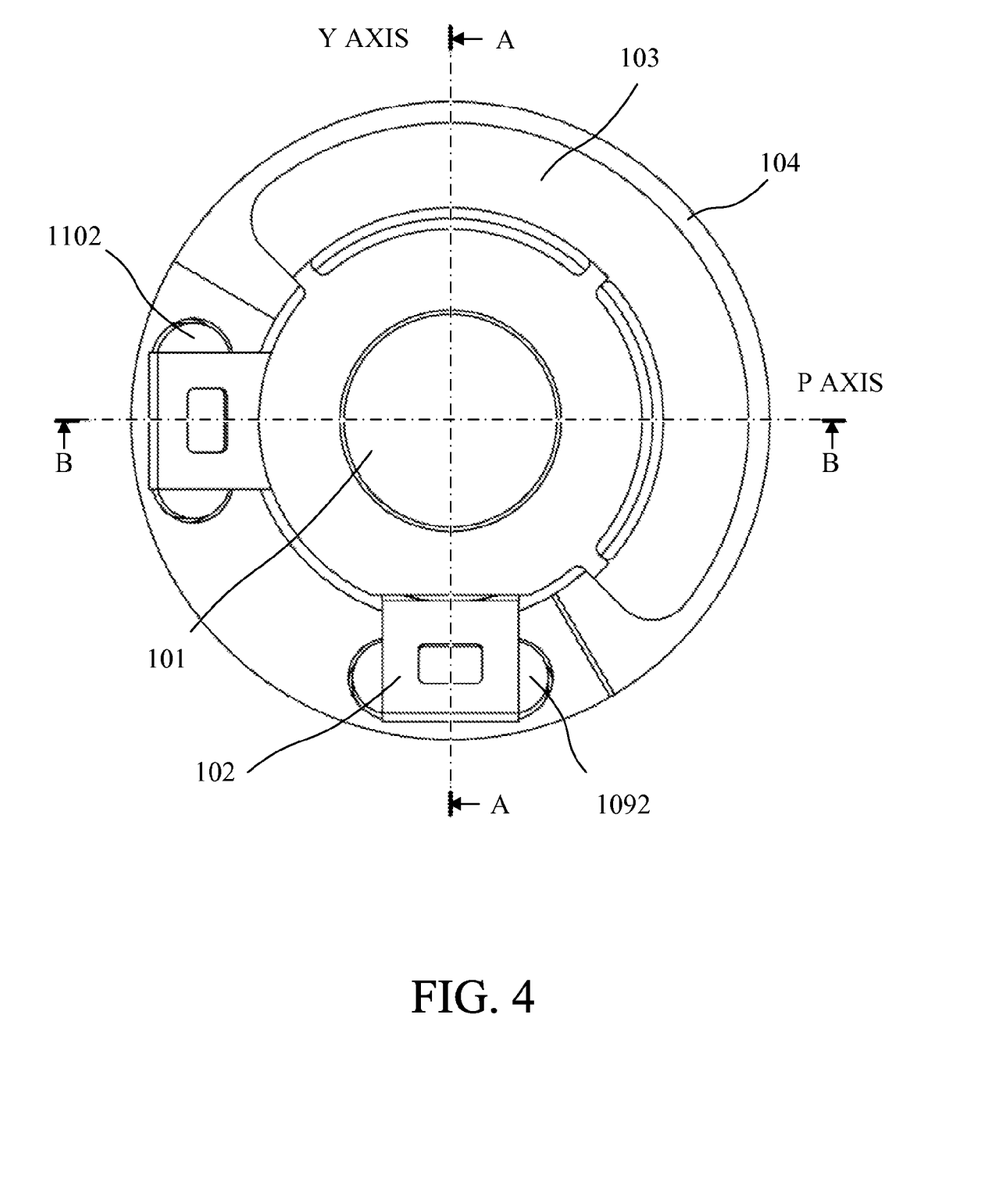
FIG. 4 is a front view of the image stabilizer after assembly.

First, each component of the image stabilizer 100 is explained referring to FIGS. 1 to 4. FIG. 1 is an exploded perspective view of the image stabilizer 100, and FIG. 2 is an exploded perspective view of the image stabilizer 100 when viewed from a direction opposite to a direction of FIG. 1. FIGS. 3A-3D are schematic diagrams illustrating a rotation preventing plate 103. FIGS. 3A-3C are a front view, a right side view, and a bottom view, respectively. FIG. 3D is a perspective view when viewed from a back side of FIG. 1. FIG. 4 is a front view of the image stabilizer 100 after assembly.

The image stabilizer 100 is a part of an image pickup optical system (not illustrated), and an image formed by the image pickup optical system in a plane perpendicular to an optical axis so as to secure stabilization on an image plane when detected hand shake. The image stabilizer 100 includes a movable unit 102 holding a correcting lens 101, the rotation preventing plate 103, and a fixing base plate 104. The image stabilizer 100 further includes a first rolling ball 105, a second rolling ball 106, a first urging magnet 107, a second urging member 108, a first driver 109, and a second driver 110. The first driver 109 includes a first driving magnet 1091 and a first coil 1092. The second driver 110 includes a second driving magnet 1101 and a second coil 1102.

The correcting lens (correcting member) 101 moves along a surface of a sphere having a rotation center point O on the optical axis as a spherical center. An image pickup element and a prism also may be used as the correcting member other than the correcting lens.

A virtual line passing through the rotation center point O and being perpendicular to the optical axis of the image pickup optical system is defined as a pitch rotating axis (second rotating axis, "P axis" in figures). A virtual line passing through the rotation center point O and being perpendicular to the optical axis and the pitch rotating axis is also defined as a yaw rotating axis (first rotating axis, "Y axis" in figures). Moreover, when viewed from the correcting lens 101, a surface on a rotation center point O side and an opposite surface are defined as a front surface and a back surface, respectively.

The movable unit (movable member) 102 holds the correcting lens 101 in an opening part provided in the center thereof. A movable side cylindrical surface 1021 is formed on the front surface side of the movable unit 102. The movable side cylindrical surface 1021 is formed in a cylindrical shape having the yaw rotating axis as a center axis and is arranged so as to face a second cylindrical part 1032 as described below. Two movable side V-shaped second ball receivers 1022, a movable side plane second ball receiver 1023, and two second urging magnet holders 1024 are formed on the movable side cylindrical surface 1021. Two driving magnet holders 1025 are also formed on an outer peripheral edge of the movable side cylindrical surface 1021.

The movable side V-shaped second ball receivers 1022 are grooves having V-shaped section, and their shapes are formed by two rotating surface (surface of rotating body) having the yaw rotating axis as a center axis. The movable side V-shaped second ball receivers 1022 thus comes into contact with the second rolling ball 106 at two points. Each of the movable side V-shaped second ball receivers 1022 is formed by two conical surfaces having the yaw rotating axis as a center axis in this embodiment, but is not limited to the above shape. If the ball is always contacted at two points and rotates so that a locus of the ball becomes an arc shape having the yaw rotating axis as a center axis, the movable side V-shaped second ball receiver may be formed by two surfaces of spheres of which spherical centers are two points on the yaw rotating axis different from each other, and torus surfaces. A movable side plane second ball receiver 1023 comes into contact with the second rolling ball 106 at a point. The second urging magnet holders 1024 hold the second urging magnet 108. The driving magnet holders 1025 hold the first and second driving magnet 1091, 1101.

As illustrated in FIG. 3A, the rotation preventing plate (restricting member) 103 is formed in an approximately disk shape, and an opening part formed on a center thereof is available as a light path of the correcting lens 101. The rotation preventing plate 103 includes a first cylindrical part 1031, the second cylindrical part 1032, and a coupling part 1033. As illustrated in FIG. 3B, the first cylindrical part 1031 is formed in a cylindrical shape having the pitch rotating axis as a center axis, and arranged on an outer peripheral side of the rotation preventing plate 103. As illustrated in FIG. 3C, the second cylindrical part 1032 is formed in a cylindrical shape having the yaw rotating axis as a center axis, and is arranged on an inner peripheral side of the rotation preventing plate 103. The coupling part 1033 couples the first cylindrical part 1031 with the second cylindrical part 1032. The rotation preventing plate 103 is also made of ferromagnetic, such as iron.

Two restricting side V-shaped first ball receivers 1034 and a restricting side plane first ball receiver 1035 are formed on a back surface side of the first cylindrical part 1031. Two restricting side V-shaped second ball receivers 1036 and a restricting side plane second ball receiver 1037 are also formed on a back surface side of the second cylindrical part 1032.

The restricting side V-shaped first ball receivers 1034 are grooves having V-shaped section, and their shapes are formed by two rotating surface having the pitch rotating axis as a center axis. Each of the restricting side V-shaped first ball receivers 1034 is formed by two conical surfaces having the pitch rotating axis as a center axis in this embodiment, and comes into contact with the first rolling ball 105 at two points. The restricting side plane first ball receiver 1035 is a groove whose bottom face is a cylindrical surface having the pitch rotating axis as a center axis, and comes into contact with the first rolling ball 105 at a point.

The restricting side V-shaped second ball receivers 1036 are grooves having V-shaped section, and their shapes are formed by two rotating surface having the yaw rotating axis as a center axis. Each of the restricting side V-shaped first ball receivers 1036 is formed by two conical surfaces having the yaw rotating axis as a center axis in this embodiment, and comes into contact with the second rolling ball 106 at two points. The restricting side plane second ball receiver 1037 is a groove whose bottom face is a cylindrical surface having the yaw rotating axis as a center axis. The restricting side plane second ball receiver 1037 comes into contact with the second rolling ball 106 at a point.

The fixing base plate (support member) 104 is formed in an approximately disk shape, and is fixed to a lens barrel fixing other lens groups. An opening part in the center thereof is available as the light path of the correcting lens 101. A fixing side cylindrical surface 1041 is formed on a front surface side of the fixing base plate 104. The fixing side cylindrical surface 1041 is formed in a cylindrical shape having the yaw rotating axis as a center axis and is arranged so as to face the first cylindrical part 1031. Two fixing side V-shaped first ball receivers 1042, a fixing side plane first ball receiver 1043, two first urging holders 1044, and two coil holders 1045 are formed on the fixing side cylindrical surface 1041.

The fixing side V-shaped first ball receivers 1042 are grooves having V-shaped section, and their shapes are formed by two rotating surface having the pitch rotating axis as a center axis. Each of the fixing side V-shaped first ball receivers 1042 is formed by two conical surfaces having the pitch rotating axis as a center axis in this embodiment. Each of the fixing side V-shaped first ball receivers 1042 is arranged so as to face corresponding restricting side V-shaped first ball receivers 1034, and comes into contact with the first rolling ball 105 at two points. The fixing side plane first ball receiver 1043 is a groove having the pitch rotating axis as a center axis. The fixing side plane first ball receiver 1043 is arranged so as to face the restricting side plane first ball receiver 1035, and comes into contact with the first rolling ball 105 at a point. The first urging holders 1044 hold the first urging magnet 107. The coil holders 1045 hold the first and second coils 1092.

The movable unit 102 and the fixing base plate 104 are formed on a back surface side of the rotation preventing plate 103 on in this embodiment. In other words, since the movable unit 102 and the fixing base plate 104 are arranged along a radial direction, a scale in an optical axis direction of the entire apparatus is capable of being reduced.

Three first rolling balls (first rolling member) 105 and three second rolling balls (second rolling member) 106 are spherically formed.

The first urging magnet 107 is a permanent magnet, and is fixed on the fixing side cylindrical surface 1041 so as to face the rotation preventing plate 103. A surface of the first urging magnet 107 facing the rotation preventing plate 103, which is made of ferromagnetic, is magnetized an N-pole, and magnetic attraction is created between the rotation preventing plate 103 and the fixing base plate 104. In other words, the first urging member 107 and the rotation preventing plate 103 serve as a first urging member in this embodiment.

The second urging magnet 108 is a permanent magnet, and is fixed on the movable side cylindrical surface 1021 so as to face the rotation preventing plate 103. A surface of the second urging magnet 108 facing the rotation preventing plate 103, which is made of ferromagnetic, is magnetized an N-pole, and magnetic attraction is created between the rotation preventing plate 103 and the movable unit 102. In other words, the second urging member 108 and the rotation preventing plate 103 serve as a second urging member in this embodiment.

The urging member in this embodiment uses magnetic attraction, but the invention is not limited to this system. A method using elastic force of a coil spring and a method using electrostatic force may be used.

The first and second drivers 109, 110 are electromagnetic drivers. Each driver includes a driving magnet (permanent magnet) and a coil (electromagnetic coil).

The first driver 109 is a voice coil motor. The first driving magnet 1091 is formed in a rectangular parallelepiped shape, and is attached to the driving magnet holders 1025 of the movable unit 102. A surface of the first driving magnet 1091 facing the first coil 1092 is divided into two parts at the center, and divided parts are magnetized so that a normal direction of the facing surface is a magnetic direction. One divided part is magnetized so as to be an N-pole, and another divided part is magnetized so as to be an S Pole. Another side of the facing surface facing the first coil 1092 may be magnetized so as to be opposite to magnetic pole of the facing surface, or may be not magnetized if thickness of the magnetic is sufficiently thick. The first coil 1092 is winding coil formed in an elliptical form, and is attached to coil holders 1045 of the fixing base plate 104. One surface of the first coil 1092 faces to a magnetized surface of the first driving magnet 1091. When driving controller (not illustrated) energizes the first coil 1092, Lorentz force is generated in a direction perpendicular to a magnetization direction of the first driving magnet 1091 and an energizing direction. Driving force thus works in the yaw direction between the fixing base plate 104 and the movable unit 102.

The second driver 110 is a voice coil motor. Since the second driver 110 is the same configuration as the first driver 109 except for arranging at 90 degrees in an optical axis rotational direction relative to the first driver 109, the detailed explanation is omitted. When the driving controller (not illustrated) energizes the second coil 1102, Lorentz force is generated in a direction perpendicular to a magnetization direction of second driving magnet 1101 and an energizing direction. Driving force thus works in the pitch direction between the fixing base plate 104 and the movable unit 102.

Since the first and second driver 109, 110 are arranged on an outer peripheral side (a side apart from the optical axis) of the correcting lens 101, an inner peripheral part of the movable unit 102 is available as the light path of the correcting lens 101. If a predetermined driving force works in the pitch and yaw directions, a type of a driver is not limited and a driving principle does not matter. A driver, such as a stepping motor, an ultrasonic motor, a motor utilizing electrostatic force, and a bimorph, may be used other than the voice coil motor used in this embodiment.

Next, positioning in the optical axis direction of the image stabilizer 100 is explained.

First, positioning in the optical axis direction of the correcting lens 101 is explained.

The first rolling balls 105 are sandwiched by the fixing side V-shaped first ball receivers 1042, the fixing side plane first ball receiver 1043, the restricting side V-shaped first ball receivers 1034, and the restricting side plane first ball receiver 1035. Attraction between the first urging magnet 107 and the rotation preventing plate 103 urges the rotation preventing plate 103 in the optical axis direction relative to the fixing base plate 104. Three first rolling balls 105 are thus respectively urged from individual contact surface, and as a result, each position in the optical axis direction is stably determined. Since the rotation preventing plate 103 is positioned at three points at the same time, a position in the optical axis direction relative to the fixing base plate 104 thereof is stably determined.

Additionally, the second rolling balls 106 are sandwiched by the restricting side V-shaped second ball receivers 1036, the fixing side plane second ball receiver 1037, the movable side V-shaped second ball receivers 1022, and the movable side plane second ball receiver 1023. Attraction between the second urging magnet 108 and the rotation preventing plate 103 urges the movable unit 102 in the optical axis direction relative to the rotation preventing plate 103. Three second rolling balls 106 are thus respectively urged from individual contact surface, and as a result, each position in the optical axis direction is stably determined. Since the movable unit 102 is positioned at three points at the same time, a position in the optical axis direction relative to the rotation preventing plate 103 thereof is stably determined.

Therefore, a position in the optical axis direction of the correcting lens 101 held by the movable unit 102 is stably positioned relative to the fixing base plate 104 holding other lens groups in this embodiment.

Next, an operation of the image stabilizer is explained.

Two first rolling balls 105 rotate so that they come contact with the restricting side V-shaped first ball receivers 1034 and the fixing side V-shaped first ball receivers 1042 at two points. Each of the first rolling balls 105 is thus rotatable only in a rotating directions around a pitch rotating axis, and rotation in a rotating direction around a yaw rotating direction thereof is restricted. As a result, the rotation preventing plate 103 is supported so as to be movable in the pitch direction relative to the fixing base plate 104.

Two second rolling balls 106 rotate so that they come contact with the movable side V-shaped second ball receivers 1022 and the restricting side V-shaped second ball receivers 1036 at two points. Each of the second rolling balls 106 is thus rotatable only in a rotating directions around the yaw rotating axis, and rotation in a rotating direction around the pitch rotating direction thereof is restricted. As a result, the movable unit 102 is supported so as to be movable in the yaw direction relative to the rotation preventing plate 103.

Figure 5A:
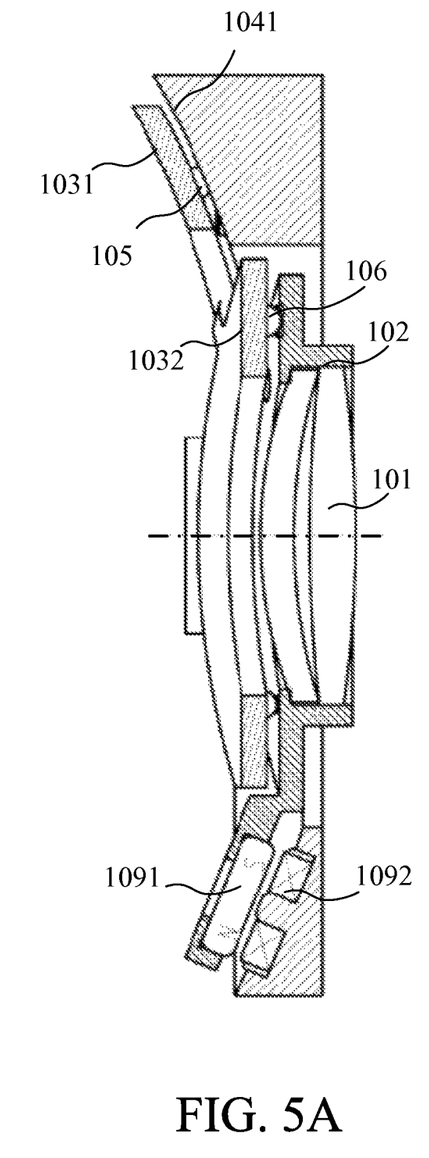
FIGS. 5A and 5B are sectional views when cut by a surface parallel to an optical axis.
Figure 5B:
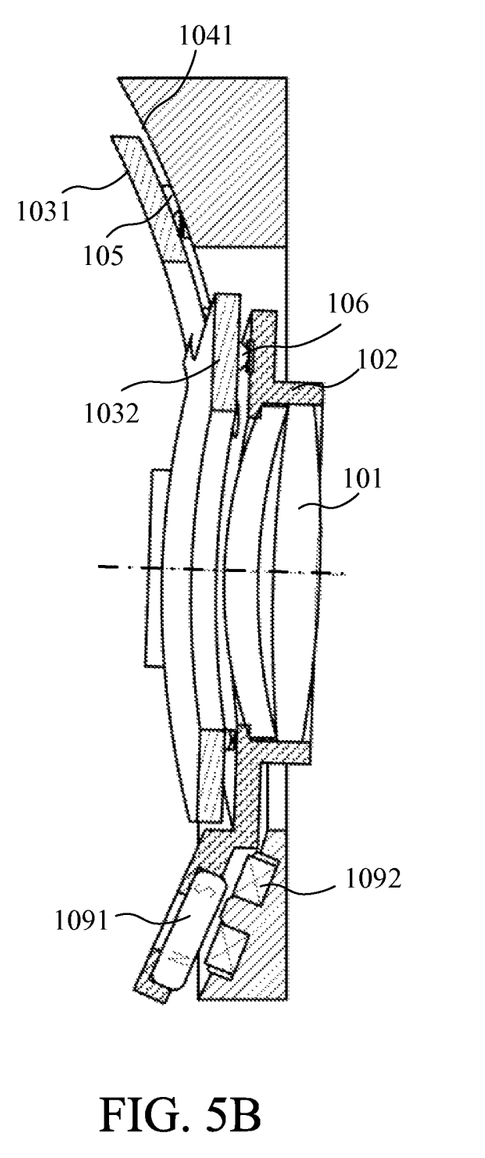
Figure 6A:
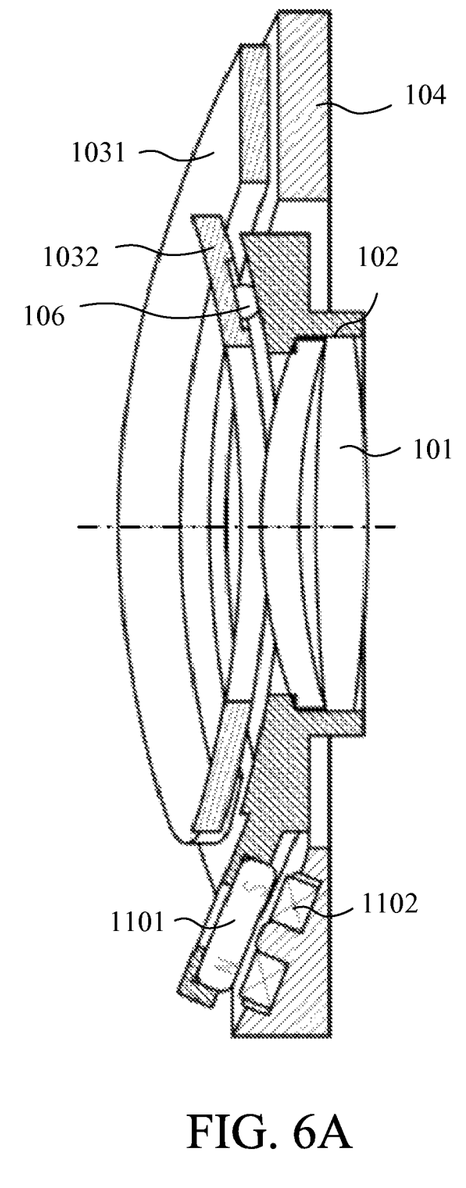
FIGS. 6A and 6B are sectional views when cut by a surface parallel to the optical axis and perpendicular to a paper surface of FIGS. 5A and 5B.
Figure 6B:
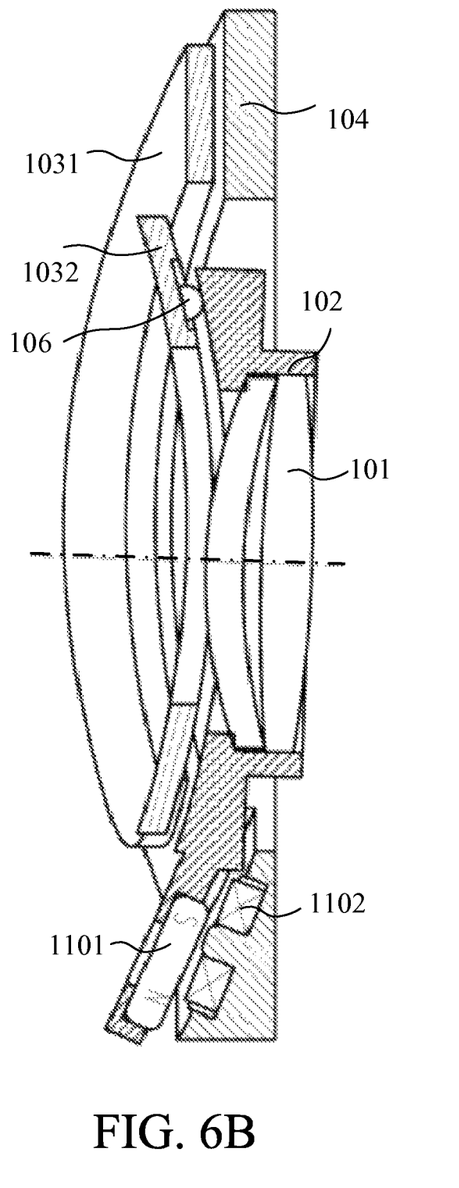

FIGS. 5A and 5B are sectional views when cut by a surface parallel to the optical axis (sectional view taken along A-A line of FIG. 4), FIG. 5A represents a state where the movable unit 102 is positioned at a center of a movable region, and FIG. 5B represents a state where the movable unit 102 is moved in the pitch direction. FIGS. 6A and 6B are sectional views when cut by a surface parallel to parallel to the optical axis and perpendicular to FIGS. 5A and 5B (sectional view taken along B-B line of FIG. 4), FIG. 6A represents a state where the movable unit 102 is positioned at the center of the movable region, and FIG. 6B represents a state where the movable unit 102 is moved in the yaw direction.

When the predetermined electrical current is applied to the first coil 1092, driving forth in the pitch direction is caused between the fixing base plate 104 and the movable unit 102 by the first driver 109. As a result, the movable unit 102, the second rolling ball 106, and the rotation preventing plate 103 move in the rotating direction having the pitch rotating axis as a center axis. For the above driving, the image stabilizer 100 becomes the state of FIG. 5A to the state of FIG. 5B. The movable unit 102 then moves along with the rotation preventing plate 103, and is rotatable to the fixing base plate 104. Additionally, when the predetermined electrical current is applied to the second coil 1102, driving forth in the yaw direction is caused between the fixing base plate 104 and the movable unit 102 by the second driver 110. As a result, the movable unit 102 moves in the rotating direction having the yaw rotating axis as a center axis. For the above driving, the image stabilizer 100 becomes the state of FIG. 6A to the state of FIG. 6B.

Combining the above two methods is capable of moving a center point of the correcting lens 101 to an arbitrary position on the spherical surface having the rotation center point O as a spherical center while restricting a rotation around the optical axis. Since the yaw rotating axis and the pitch rotating axis intersect with each other at the rotation center point O in the invention, a curvature radius of moves around both rotating axis equals. Degradation according to a moving direction of an optical performance change when driving the correcting lens 101 can be thus reduced. Even if the yaw rotating axis and the pitch rotating axis are not perpendicular to each other, a move to the arbitrary position on the spherical surface is performable. But being perpendicular to each other in this embodiment is capable of making both moving direction independent and achieving excellent control.

Additionally, feedback control may be performed by detecting the position of the correcting lens 101 with a position sensor not illustrated. By doing this, positioning accuracy of the correcting lens is capable of increasing.

The rolling balls rotatably support the movable unit 102 being a movable part and the rotation preventing plate 103 in this embodiment. In doing so, the moving part is supportable by a mechanism having small friction, and high accuracy and high efficiency performance thus is achievable. Meanwhile, each moving part of the movable unit 102 and the rotation preventing plate 103 may be slidably supported without using the rolling balls unlike this embodiment when reducing components and existing high risk of a drop of the rolling ball.

As explained above, the rotation preventing plate 103 is supported so as to rotate in only direction having the pitch rotating axis as a center axis relative to the fixing base plate 104 in the image stabilizer 100 of the invention. The movable unit 102 is supported so as to rotate in only direction having the yaw rotating axis as a center axis relative to the rotation preventing plate 103. As a result, the correcting lens 101 is movable around the pitch and yaw rotating directions with the rotation center point O as the center while restricting a rotation around the optical axis as a center axis. In other words, the configuration is capable of moving in only direction necessary for image stabilization. Thus, even if shocked externally, the position of the correcting lens 101 is accurately detected and high precise image stabilization is achievable.

Moreover, the rotation preventing plate 103 used in the invention includes the first cylindrical part 1031 and the second cylindrical part 1032. Driving on a predetermined spherical surface of the correcting lens 101 is achievable without forming a spherical shape. High mass productivity of the rotation preventing plate 103 can be ensured by a machining method, such as press work, but machining of cylindrical parts is generally easily than machining of spherical shape parts. Processing difficulty is capable of decreasing by avoiding a spherical shape configuration as the invention. Reduction of a manufacturing cost and high machining accuracy is thus achievable.

Additionally, in the rotation preventing plate 103, moving accuracy of the correcting lens 101 is determined by machined surfaces of the restricting side V-shaped first ball receiver 1034 and the restricting side V-shaped second ball receiver 1036. These machined surfaces need to be precisely machined so as to perform a predetermined accuracy operation of the correcting lens 101. These machined surfaces are formed on the same surface (the back surface side) in this embodiment. Thus, when machining using molds, such as press work, these machined surfaces can be formed on one mold. In press work, a thickness of a mold may be unevenness by a difference of a lot. However, forming the machined surfaces on the same surface as this embodiment is capable of precisely moving the correcting lens 101 without being affected by unevenness in a thickness direction of the rotation preventing plate 103.

Embodiment 2

Figure 7:
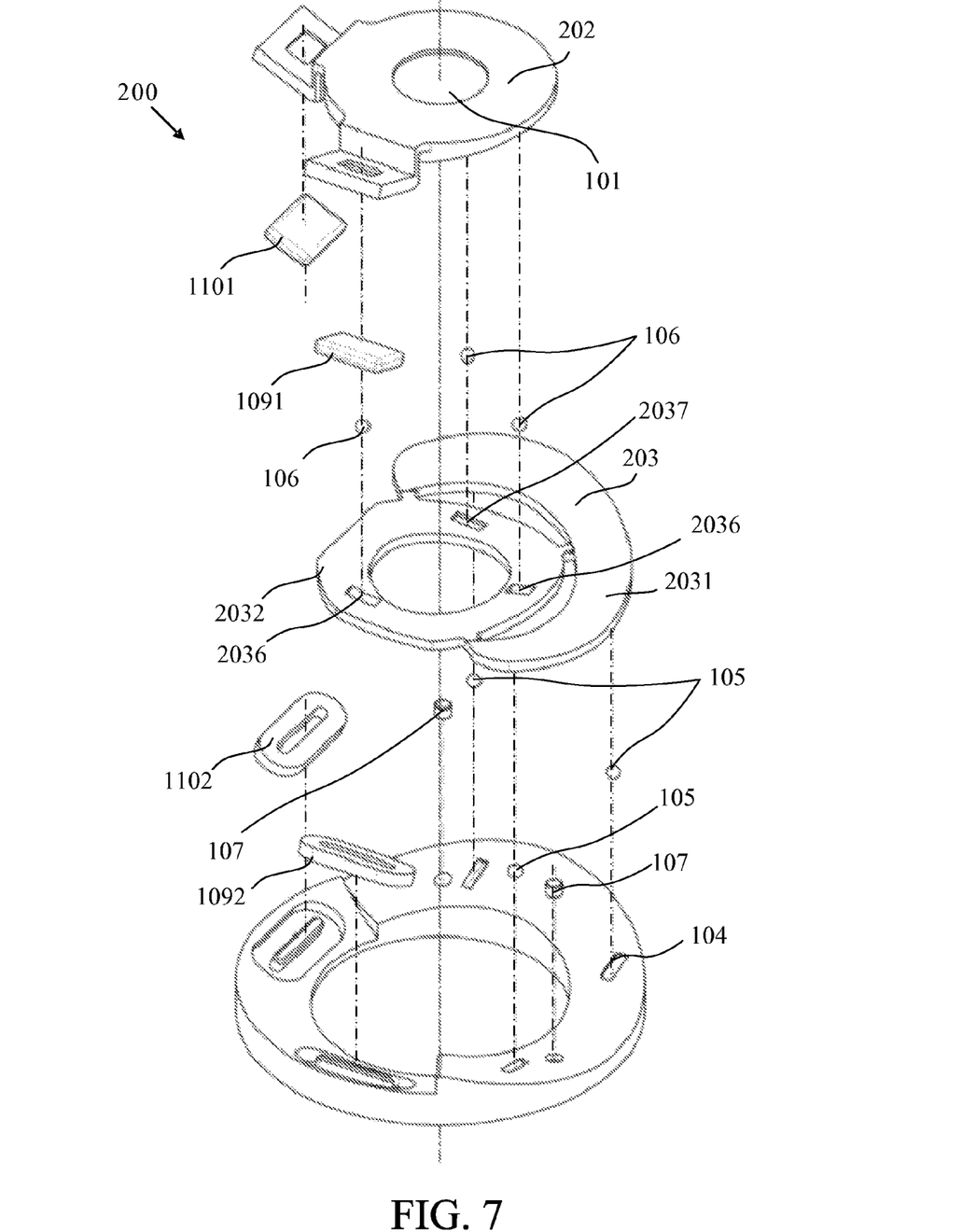
FIG. 7 is an exploded perspective view of an image stabilizer according to Embodiment 2.
Figure 8:
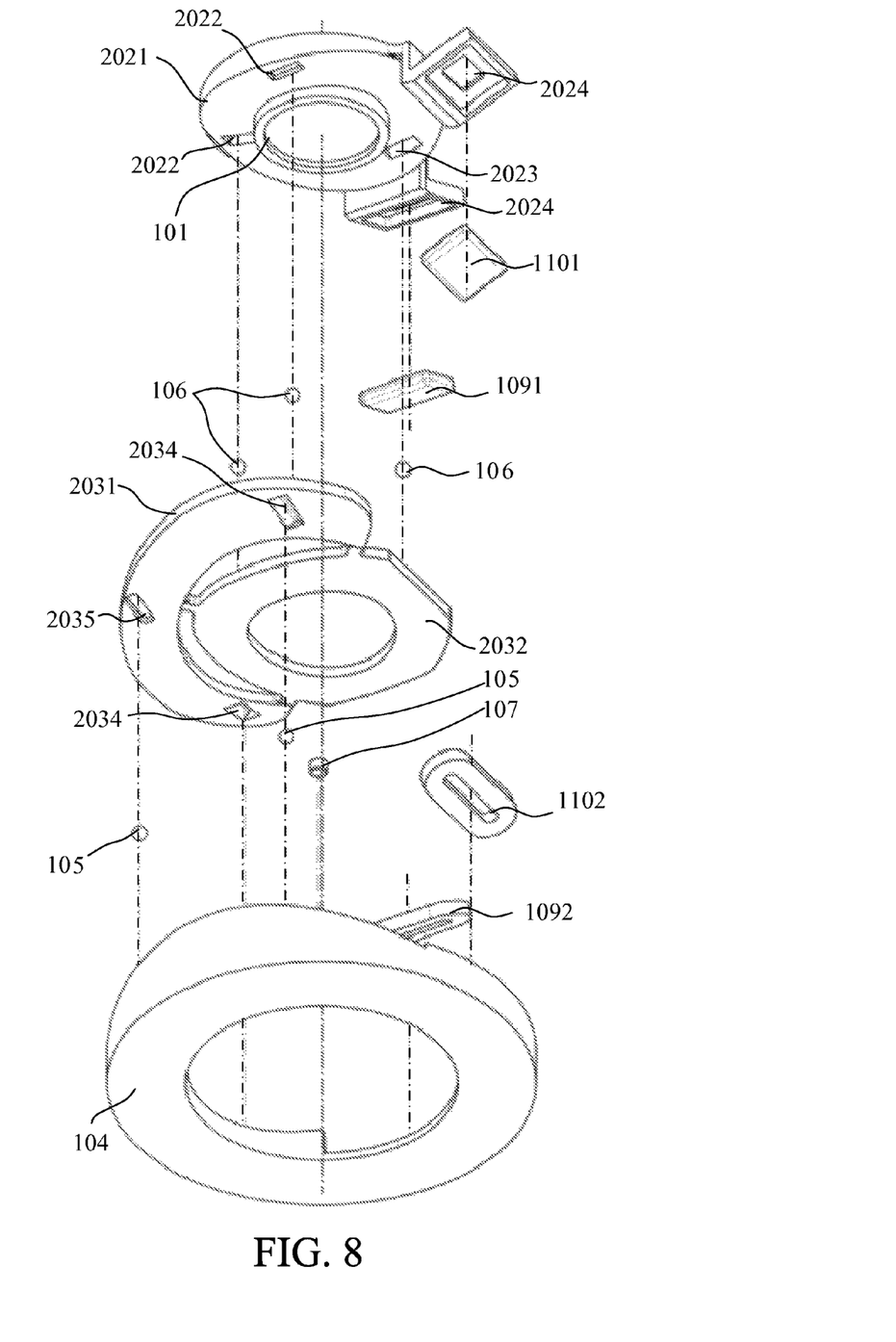
FIG. 8 is an exploded perspective view of the image stabilizer according to Embodiment 2 when viewed from other direction.
Figure 9:
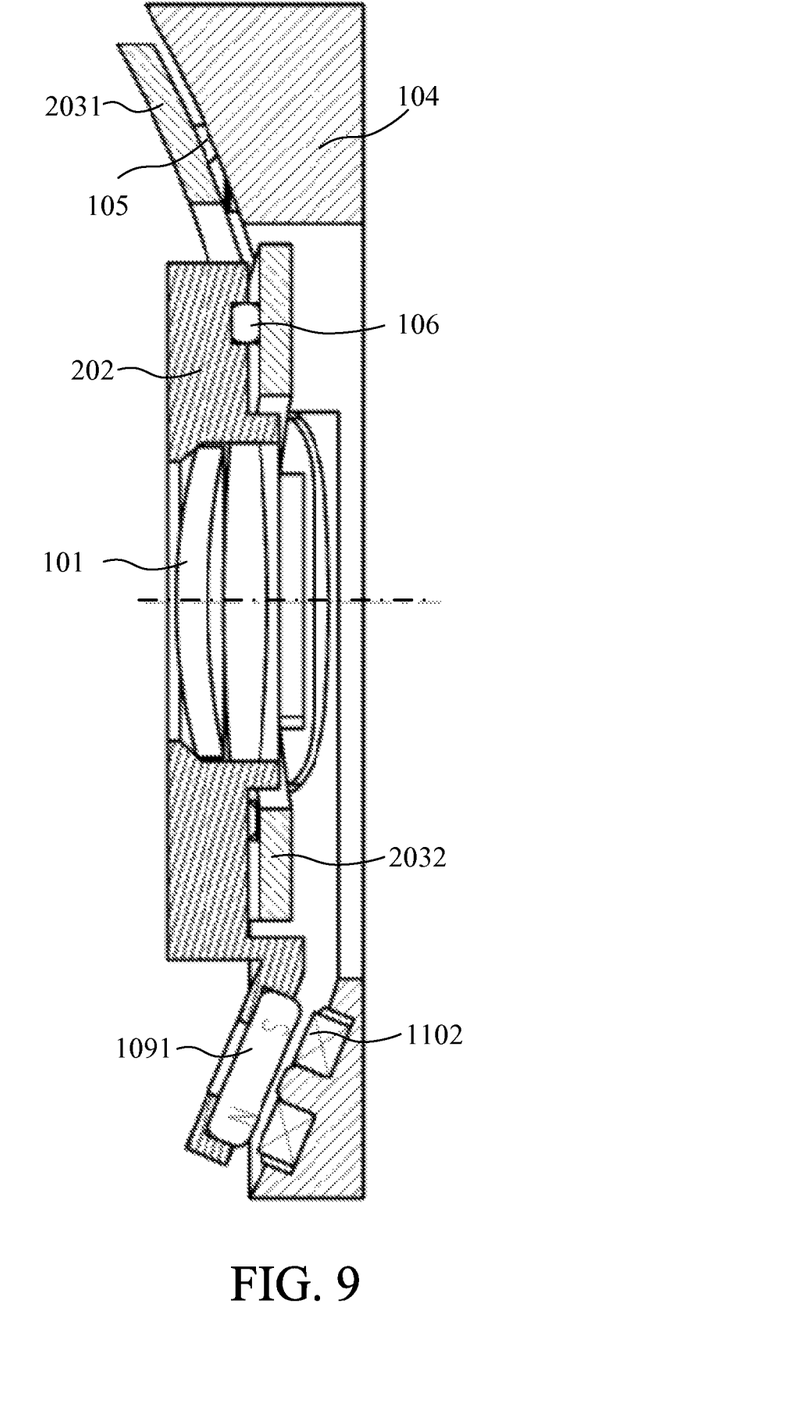
FIG. 9 is a sectional view when cut by a surface parallel to an optical axis.

An image stabilizer 200 of this embodiment is explained referring to FIGS. 7 to 9. FIG. 7 is an exploded perspective view of the image stabilizer 200, and FIG. 8 is an exploded perspective view of the image stabilizer 200 when viewed from a direction opposite to a direction of FIG. 7. FIG. 9 is a sectional view when cut the image stabilizer 200 by a surface parallel to an optical axis after assembly. FIG. 9 corresponds to FIG. 6A of Embodiment 1. The same components as Embodiment 1 are denoted by the same reference numerals and an explanation thereof is omitted.

The image stabilizer 200 includes a movable unit 202 holding a correcting lens 101, a rotation preventing plate 203, and a fixing base plate 104. The image stabilizer 200 further includes a first rolling ball 105, a second rolling ball 106, a first urging magnet 107, a first driver 109, and a second driver 110.

A movable side cylindrical surface 2021 is formed on a back surface side of the movable unit 202. The movable side cylindrical surface 2021 is formed in a cylindrical shape having a yaw rotating axis as a center axis and is arranged so as to face a second cylindrical part 2032 as described below. Two movable side V-shaped second ball receivers 2022, a movable side plane second ball receiver 2023, and two second urging magnet holders 2024 are formed on the movable side cylindrical surface 2021. The movable side V-shaped second ball receivers 2022 and the movable side plane second ball receiver 2023 correspond to the movable side V-shaped second ball receivers 1022 and the movable side plane second ball receiver 1023 of Embodiment 1, respectively. Urged part 2024 is made of ferromagnetic, and is arranged so as to face a magnetization surface of the first urging magnet 107 fixed to the fixing base plate 104. Attraction is thus created between the fixing base plate 104 and the movable unit 202. In other words, the first urging magnet 107 and the movable unit 202 serve as a first urging member in this embodiment.

The rotation preventing plate 203 includes a first cylindrical part 2031, a second cylindrical part 2032, and a coupling part 2033. A back surface side of the first cylindrical part 2031 is formed in a cylindrical shape having a pitch rotating axis as a center axis, and two restricting side V-shaped first ball receivers 2034 and a restricting side plane first ball receiver 2035 are formed on the back surface side of the first cylindrical part 2031. Additionally, a front surface side of the second cylindrical part 2032 is formed in a cylindrical shape having the yaw rotating axis as a center axis, and two restricting side V-shaped second ball receivers 2036 and a restricting side plane second ball receiver 2037 are formed on the front surface side of the second cylindrical part 2032.

The movable unit 202, the second rolling ball 106, the rotation preventing plate 203, the first rolling ball 105, and the fixing base plate 104 are arranged in order from a front surface side in the image stabilizer 200 of this embodiment. Additionally, the first urging magnet 107 urges components arranged between the movable unit 202 and the fixing base plate 104. A position in an optical axis direction of the correcting lens 101 held by the movable unit 202 is thus stably determined relative to the fixing base plate 104 holding other lens groups. Moreover, a center point of the correcting lens 101 is capable of being moved to an arbitrary position on a spherical surface having a rotation center point O as a spherical center In this embodiment, the restricting side V-shaped second ball receivers 2036 and the restricting side plane second ball receiver 2037 are formed on a front surface side of the rotation preventing plate 203, and the restricting side V-shaped first ball receivers 2034 and the restricting side plane first ball receiver 2035 are formed on a back surface side of the rotation preventing plate 203. The rotation preventing plate 203 is thus capable of being arranged between the movable unit 202 and the fixing base plate 104. Urging force between the movable unit 202 and the fixing base plate 104 also urges the rotation preventing plate 203. Therefore, in this embodiment, only the first urging member rotatably supports the movable unit 202 and the rotation preventing plate 203.

Embodiment 3

Figure 10:
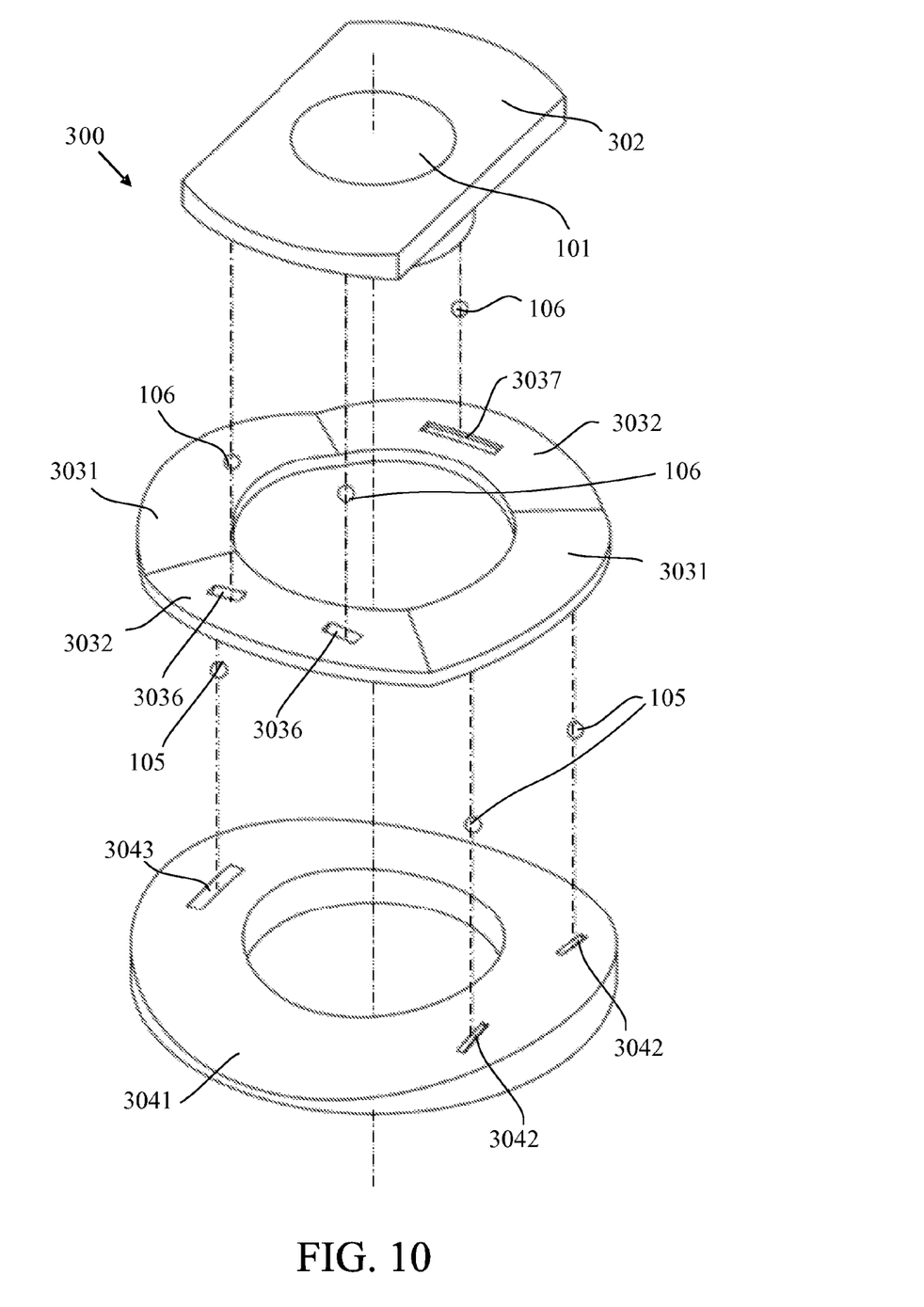
FIG. 10 is an exploded perspective view of an image stabilizer according to Embodiment 3.
Figure 11:
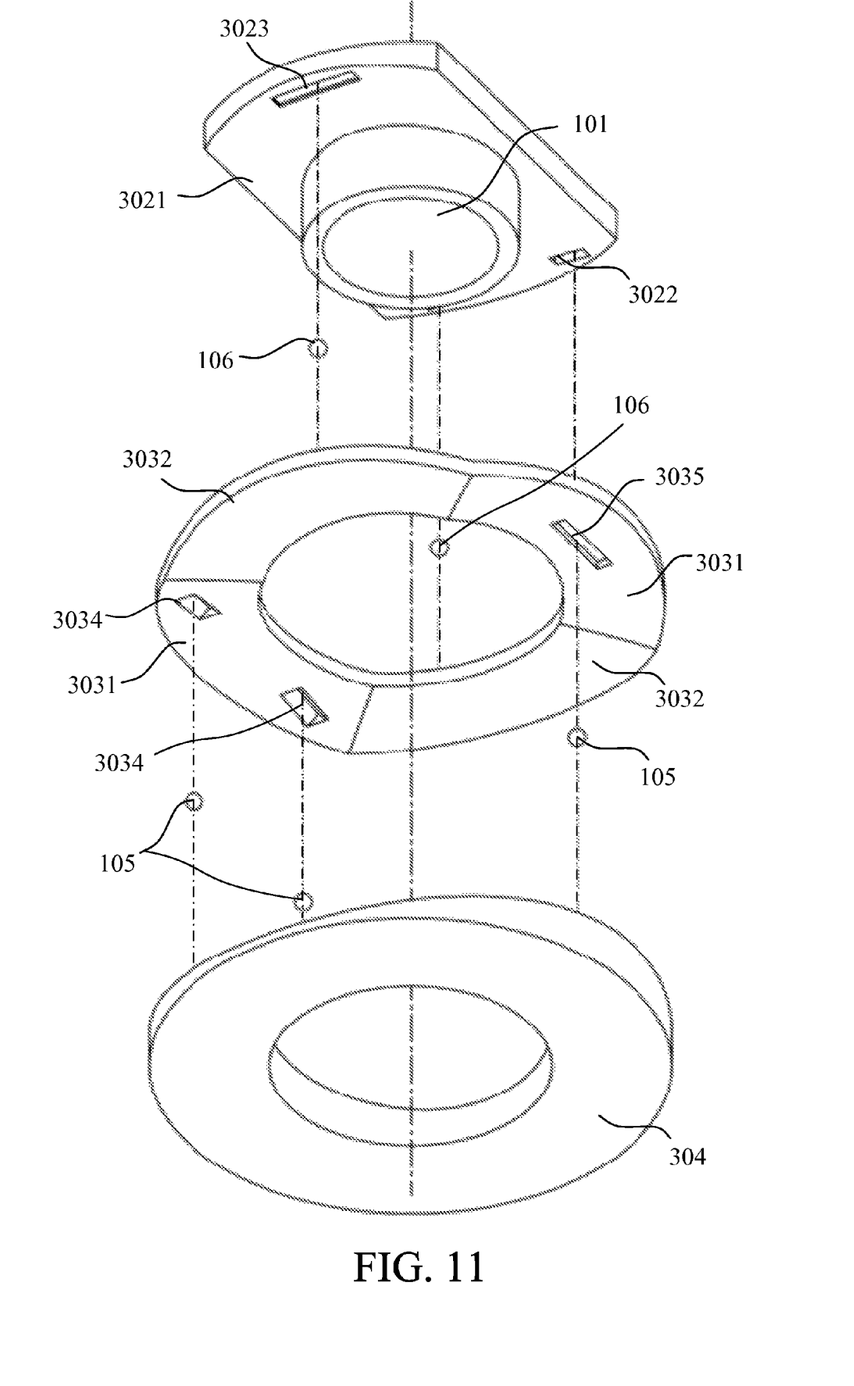
FIG. 11 is an exploded perspective view of the image stabilizer according to Embodiment 3 when viewed from other direction.

An image stabilizer 300 of this embodiment is explained referring to FIGS. 10 and 11. FIG. 10 is an exploded perspective view of the image stabilizer 300, and FIG. 11 is an exploded perspective view of the image stabilizer 300 when viewed from a direction opposite to a direction of FIG. 10. The same components as Embodiment 1 are denoted by the same reference numerals and an explanation thereof is omitted.

The image stabilizer 300 includes a movable unit 302 holding a correcting lens 101, a rotation preventing plate 303, and a fixing base plate 304. The image stabilizer 300 further includes a first rolling ball 105 and a second rolling ball 106. Since a first and second drives, and a first urging member of this embodiment are the same as Embodiment 2, an explanation thereof is omitted.

A movable side cylindrical surface 3021 is formed on a back surface side of the movable unit 302. The movable side cylindrical surface 3021 is formed in a cylindrical shape having a yaw rotating axis as a center axis and is arranged so as to face a second cylindrical part 3032 as described below. Two movable side V-shaped second ball receivers 3022 and a movable side plane second ball receiver 3023 are formed on the movable side cylindrical surface 3021.

The rotation preventing plate 303 is formed in an approximately disk shape, and an opening part formed on a center thereof is available as a light path of the correcting lens 101. The rotation preventing plate 303 is divided into four in a peripheral direction, and a first cylindrical part 3031 and a second cylindrical part 3032 are respectively alternately arranged at two points. A back surface side of the first cylindrical part 3031 is formed in a cylindrical shape having a pitch rotating axis as a center axis, and two restricting side V-shaped first ball receivers 3034 and a restricting side plane first ball receiver 3035 are formed on the back surface side of the first cylindrical part 3031. Additionally, a front surface side of the first cylindrical part 3031 is formed in a cylindrical shape having the pitch rotating axis as a center axis, and two restricting side V-shaped second ball receivers 3036 and a restricting side plane second ball receiver 3037 are formed on the front surface side of the first cylindrical part 3031.

A fixing side cylindrical part 3041 facing the first cylindrical part 3031 is formed on a surface of the fixing base plate 304. Two fixing side V-shaped first ball receivers 3042 and a fixing side plane first ball receiver 3043 are formed on the fixing side cylindrical part 3041.

In a projection plane of the rotation preventing plate 103 used in Embodiment 1, the first cylindrical part 1031 is arranged on an outer peripheral side and the second cylindrical part 1032 is arranged on an inner peripheral side. In other words, the first and second cylindrical parts 1031, 1032 are arranged along the radial direction. By doing this, even if the correcting lens 101 largely moves, it is easy to avoid both interference between the movable unit 102 and the rotation preventing plate 103 and between the rotation preventing plate 103 and the fixing base plate 104. Meanwhile, when the correcting lens 101 slightly moves, interference between components becomes difficult to be generated. The first and second cylindrical parts 3031, 3032 may be thus arranged along a peripheral direction as this embodiment so that both distances from the optical axis are the same. Therefore, a size in a radial direction of the entire apparatus is reducible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-027209, filed on Feb. 17, 2014, which is hereby incorporated by reference herein in its entirety.

What is claimed is:
1. An image stabilizer comprising:
a support member;
a movable member holding a correcting member and rotatable relative to the support member around a first rotating axis, which intersects with an optical axis, or a second rotating axis, which intersects with both the optical axis and the first rotating axis; and
a restricting member which has an opening part and rotatably holds the movable member around the first rotating axis and restricts rotation of the movable member around the second rotating axis, wherein the support member rotatably holds the restricting member around the second rotating axis along with the movable member and restricts rotation of the restricting member relative to the support member around the first rotating axis, wherein the support member, the movable member, and the restricting member overlap one another in an optical axis direction, and wherein the correcting member and the opening part of the restricting member overlap with one another in the optical axis direction.

2. The image stabilizer according to claim 1, wherein a first cylindrical surface having the first rotating axis as a center axis is formed on each facing surface of the restricting member and the movable member, and wherein a second cylindrical surface having the second rotating axis as a center axis is formed on each facing surface of the restricting member and the movable member.

3. The image stabilizer according to claim 2, wherein a distance from the first cylindrical surface to the optical axis is different from a distance from the second cylindrical surface to the optical axis in a projection plane perpendicular to the optical axis.

4. The image stabilizer according to claim 2, wherein the first and second cylindrical surfaces are separately formed along a peripheral direction at the same distance from the optical axis in a projection plane perpendicular to the optical axis.

5. The image stabilizer according to claim 2, wherein the first and second cylindrical surfaces are formed on the same side surface of the restricting member in the optical axis direction so as to overlap each other.

6. The image stabilizer according to claim 5, further comprising:
  a first rolling member rotatably supporting the movable member relative to the restricting member;
  a second rolling member rotatably supporting the restricting member relative to the support member;
  a first urging member arranged between the movable member and the restricting member and configured to urge in the optical axis direction; and
  a second urging member arranged between the restricting member and the support member and configured to urge in the optical axis direction.

7. The image stabilizer according to claim 2, wherein the first and second cylindrical surfaces are formed on different side surfaces of the restriction member in the optical axis direction.

8. The image stabilizer according to claim 7, further comprising:
  a first rolling member rotatably supporting the movable member relative to the restricting member;
  a second rolling member rotatably supporting the restricting member relative to the support member; and
  an urging member arranged between the movable member and the support member and configured to urge in the optical axis direction.

9. A lens barrel comprising the image stabilizer according to claim 1.

10. An image pickup apparatus comprising the image stabilizer according to claim 1.

11. An optical apparatus comprising the image stabilizer according to claim 1.

* * * * *